Figure 1:
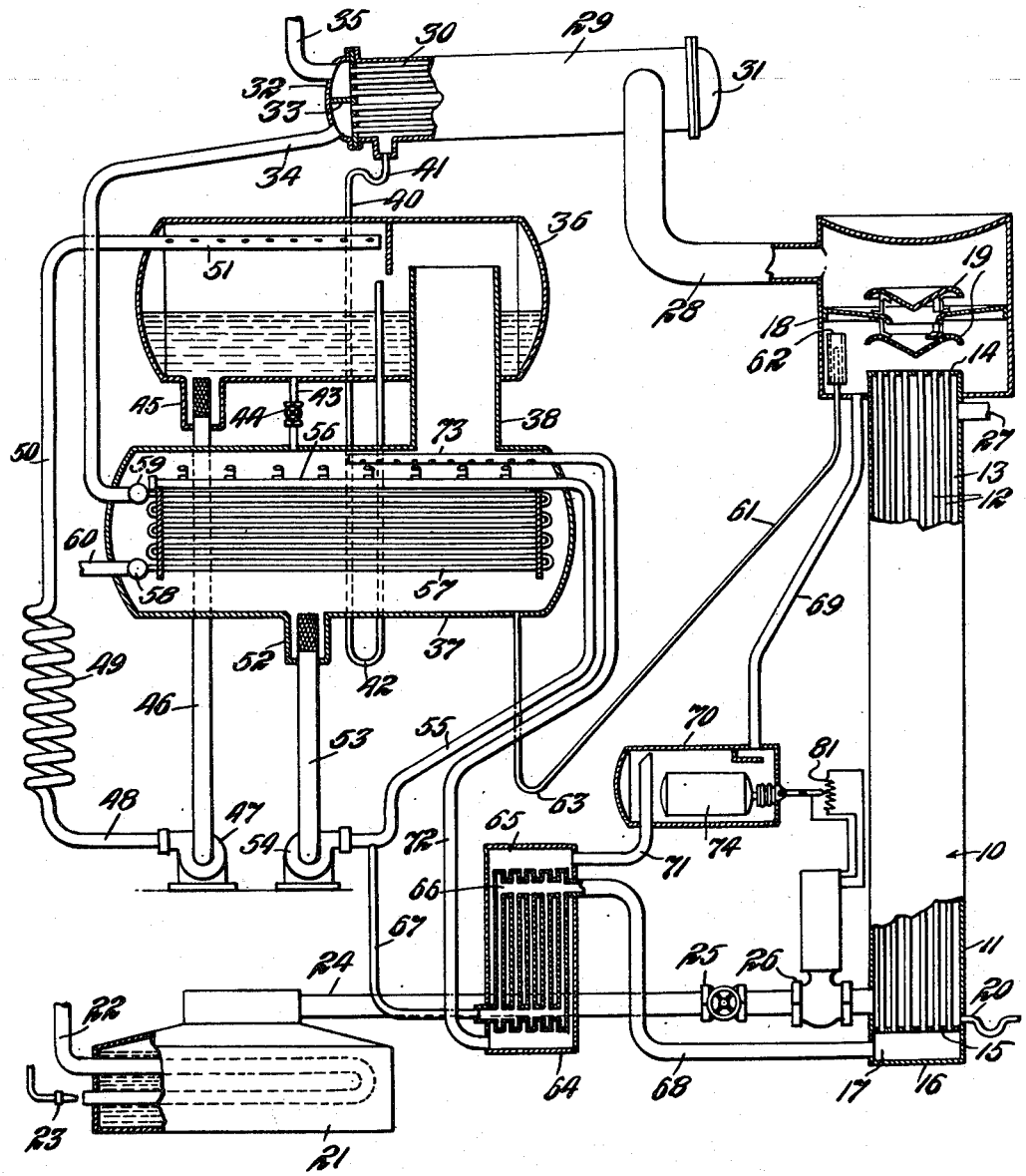

Aug. 8, 1950     A. R. THOMAS     2,518,202
VACUUM TYPE WATER ABSORPTION REFRIGERATING SYSTEM
Filed Oct. 25, 1944     4 Sheets-Sheet 1

INVENTOR
ATTORNEY

Aug. 8, 1950  A. R. THOMAS  2,518,202
VACUUM TYPE WATER ABSORPTION REFRIGERATING SYSTEM
Filed Oct. 25, 1944  4 Sheets-Sheet 2
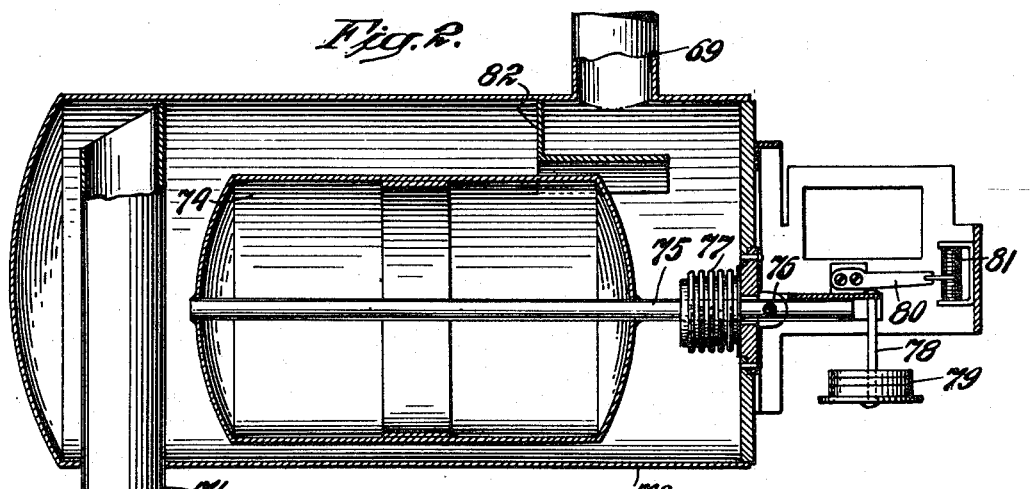
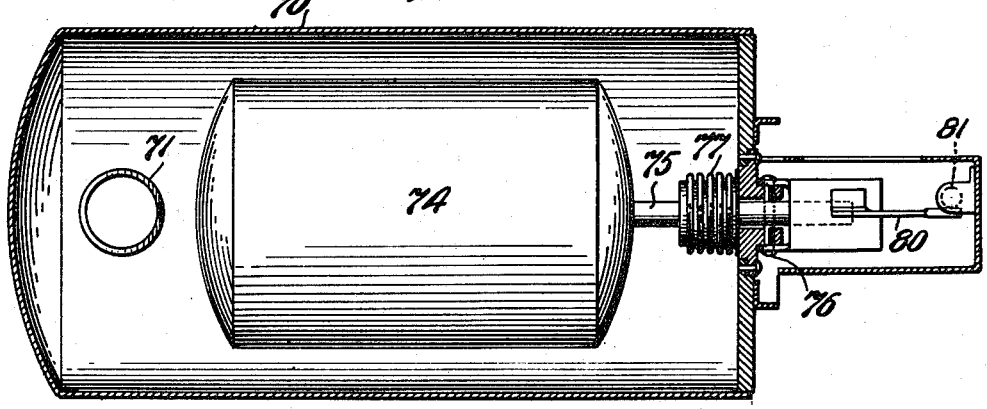
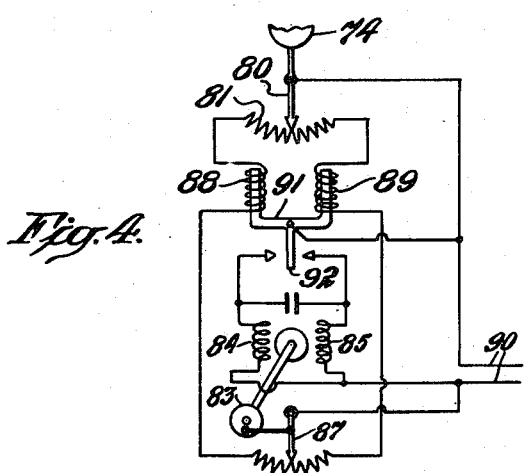
INVENTOR
Albert R. Thomas, Deceased
By The National City Bank of Evansville
Indiana, Administrator
By Oliver S. Titcomb
ATTORNEY Aug. 8, 1950         A. R. THOMAS         2,518,202
VACUUM TYPE WATER ABSORPTION REFRIGERATING SYSTEM
Filed Oct. 25, 1944         4 Sheets-Sheet 3

INVENTOR
Albert R. Thomas, Deceased
By The National City Bank of Evansville
Indiana, Administrator
By Oliver S Titcomb
ATTORNEY

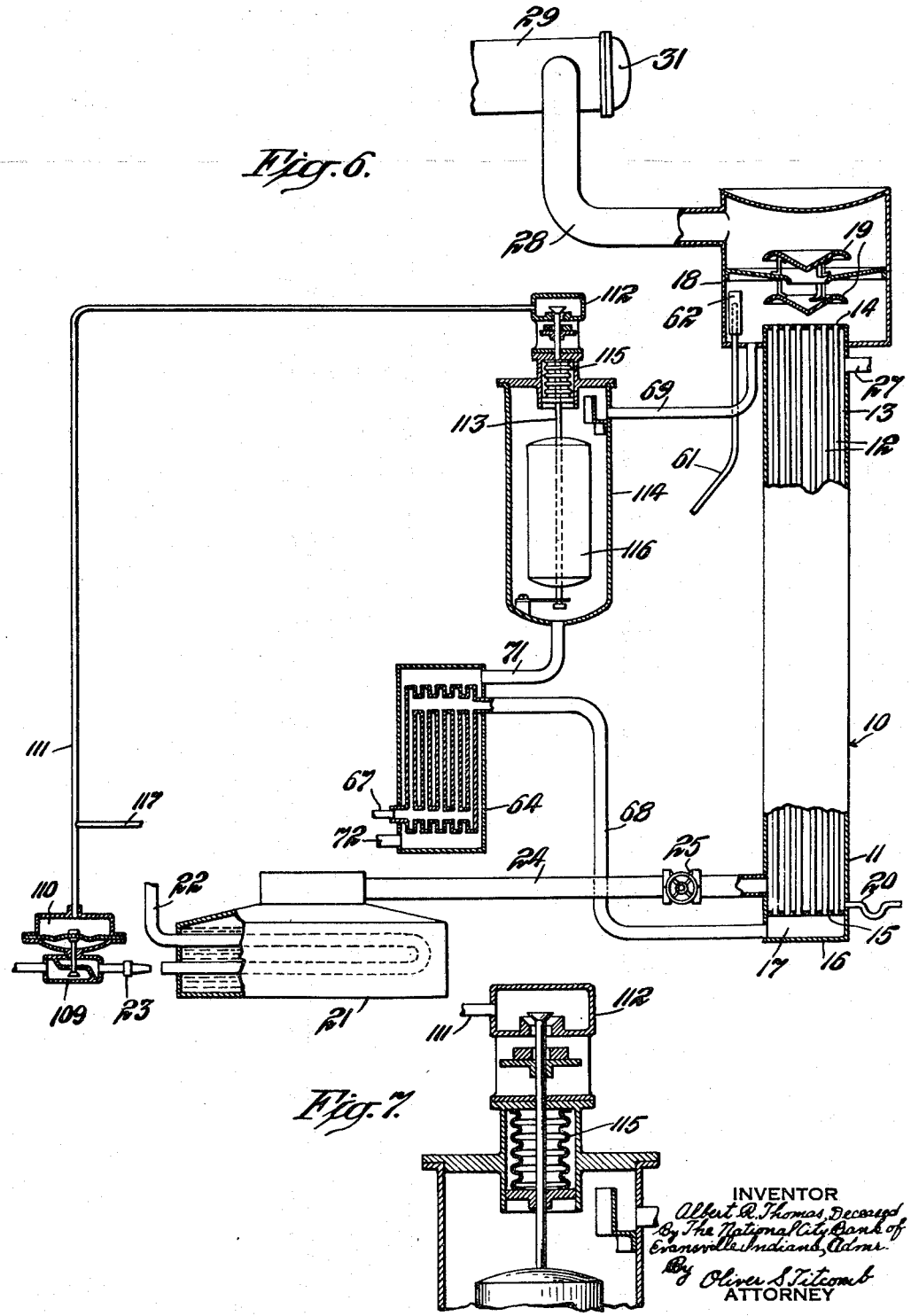

Patented Aug. 8, 1950

2,518,202

UNITED STATES PATENT OFFICE 2,518,202

VACUUM TYPE WATER ABSORPTION REFRIGERATING SYSTEM

Albert R. Thomas, deceased, late of Evansville, Ind., by The National City Bank, administrator, Evansville, Ind., assignor to Servel, Inc., New York, N. Y., a corporation of Delaware Application October 25, 1944, Serial No. 560,214

16 Claims. (Cl. 62—5)

This invention relates to absorption type refrigeration systems utilizing water as refrigerant and operating under partial vacuum.

An object of the invention is to provide such a system utilizing as absorbent a water solution of a solid material such as lithium chloride, lithium bromide, or the like, and in which deposit of the solid material does not occur under any changes that may occur in operating conditions of the system. Another object is to provide for liquid circulation and application of heat in a manner to afford large refrigerating capacity with minimum size and amount of apparatus.

A vacuum type water absorption system has an evaporator, an absorber, and a still comprising a generator or boiler and a condenser. The system contains, by way of example, a water solution of lithium bromide. Heat is applied to the generator or boiler so that water vapor is expelled from the solution. The water vapor is liquefied in the condenser and the water is conducted to the evaporator. The pressure is lower in the evaporator so the water vaporizes therein at a temperature corresponding to the pressure. The resulting vapor passes to the absorber where it is absorbed into solution. The system is evacuated so that the vaporization can proceed at a temperature in the evaporator low enough, for instance, for cooling air for comfort purposes. The still operates at a higher pressure than the evaporator and absorber.

In accordance with the present invention, the boiler is formed of a number of riser tubes in a steam jacket and liquid being heated flows upward in these tubes by a vapor lift action commonly referred to as a climbing film action. A pump is provided to cause circulation of absorbent solution in a local circuit including the absorber. The boiler or generator is in a branch circuit through which solution is withdrawn from the local absorber circuit and returned thereto after expulsion of water vapor from the solution in the generator. Flow of liquid in the branch circuit is caused partly by pressure differential due to the pump in the absorber circuit and partly by gas lift action in the generator.

Associated with that part of the branch circuit which conducts solution from the generator back to the absorber circuit there is a device for sensing the concentration of the solution. The rate of application of heat to the generator is controlled by the sensing device so that the solution concentration is kept below saturation at temperatures encountered throughout the solution circuits.

Figure 5:
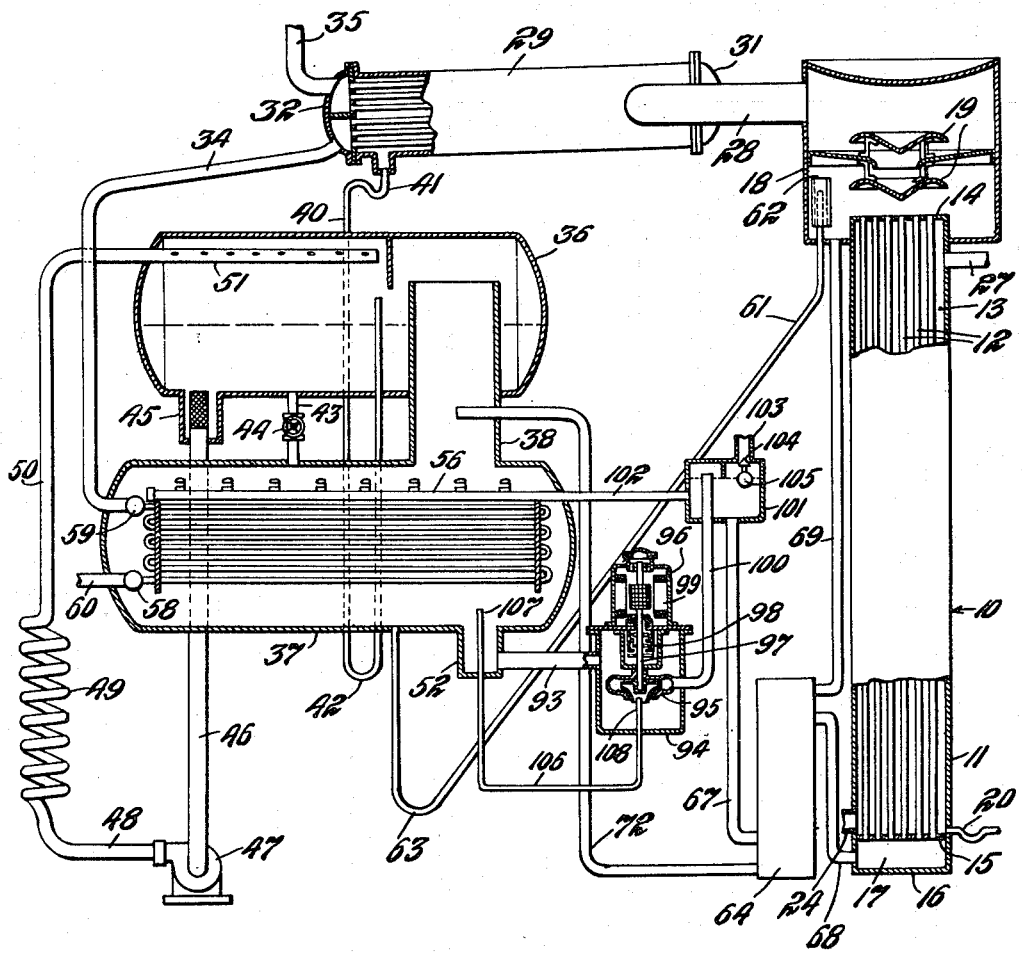

In the drawings: Fig. 1 shows more or less diagrammatically a refrigeration system embodying the invention; Figs. 2 and 3 are enlarged views showing in more detail the structure of the concentration sensing device in Fig. 1; Fig. 4 is a diagram showing the electrical connections between the concentration sensing device and the generator heating control device in Fig. 1; Fig. 5 shows more or less diagrammatically a system like that shown in Fig. 1 but having a modified solution circuit; Fig. 6 is a view of part of the system shown in Fig. 1 provided with a different arrangement for control of the generator heating by the concentration sensing device; and Fig. 7 is an enlarged view showing in more detail a portion of the control structure in Fig. 6.

Referring to Fig. 1 of the drawing, the system includes a combination generator and vapor-liquid lift 10 comprising a shell or jacket 11 within which are a number of riser tubes 12. The space 13 around the tubes 12 is closed at the upper end by a plate 14, and at the lower end by a plate 15. The open ends of the tubes 12 project through the plates 14 and 15. The lower end of the shell 11 is closed by a plate 16 which is spaced from the tube plate 15 forming an inlet header space 17. The upper end of the shell 11 projects into the lower part of an enlarged header or separating vessel 18. Baffle plates 19 are positioned in the separator 18 above the upper ends of the generator tubes 12. The lower part of the generator tube space 13 is provided with a condensate drain 20.

A steam boiler 21 has one or more heating flues 22 into the lower end of which is projected a flame of a burner 23. The dome of the steam boiler 21 is connected by a pipe 24 to the jacket space 13 of the generator 10. A hand valve 25 and a controlled motor operated valve 26 are provided in the steam pipe 24.

The hand valve 25 is normally left open. Steam flows from the boiler 21 through pipe 24 to the jacket space 13 of the generator 10 where it envelops the tubes 12 and heats these tubes to a maximum temperature of 212° F. because the upper end of the jacket space 13 is open to atmosphere through a vent 27.

The enlarged header or separator 18 at the upper end of the generator 10 is connected by a pipe 28 to a water cooled condenser 29. This condenser comprises jacketed tubes 30 opening at one end in a header 31, and at the other end in a header 32. The header 32 is divided into upper and lower halves by a partition 33. Cooling water enters the lower part of header 32 from a pipe 34, flows through the lower bank of tubes, header 31, and the upper bank of tubes to the upper part of header 32, which it leaves through a pipe 35.

An evaporator tank 36 is located above an absorber tank 37. The upper parts of these tanks are connected by a large conduit 38. The condenser 29 is connected to the evaporator 36 by a pipe 40 having a shallow trap 41, and a deep trap 42. The bottom of the evaporator 36 is connected by a pipe 43 to the top of the absorber 37. A manual valve 44 is connected in pipe 43. The bottom of the evaporator 36 has a sump 45 connected by a pipe 46 to the intake of a water pump 47. The discharge of pump 47 is connected by a pipe 48 to the lower end of a cooling coil or cold radiator 49. The upper end of coil 49 is connected by a conduit 50 to a spray head 51 in the upper part of the evaporator 36.

A sump 52 in the bottom of the absorber 37 is connected by a pipe 53 to the intake of a solution pump 54. The discharge of pump 54 is connected by a pipe 55 to a spray head 56 in the upper part of the absorber 37. A cooling coil 57 is located in the absorber tank 37 below the spray head 56. The coil 57 has a number of sections joined at the bottom by a header 58 and at the top by a header 59. A pipe 60 provides an inlet connection for cooling water to header 58. The header 59 is connected by pipe 34 to the condenser 29 as previously described. The bottom of the absorber 37 is connected to the separator 18 at the upper end of the generator by a pipe 61. The pipe 61 projects upward within the header 18 and the open end of this pipe is surrounded by a baffle plate 62. The pipe 61 forms a deep trap 63.

A liquid heat exchanger 64 has an outer liquid space 65 and an inner liquid space 66. Pipe 55 which is connected to the discharge of the solution pump 54 is also connected by a pipe 67, the inner space 66 of the liquid heat exchanger, and a pipe 68 to the bottom header 17 of the generator 10. The bottom of the generator upper header or separator 18 is connected by a pipe 69, a vessel 70, a pipe 71, the outer passage 65 of the heat exchanger, and a pipe 72 to a discharge conduit 73 located in the upper part of the absorber 37.

The vessel 70 contains a float 74. By also consulting Figs. 2 and 3 it will be seen that the float 74 is connected to a rod 75 which projects through an opening in the wall of vessel 70. The rod 75 is pivoted on a pin 76. This pivot permits the float to move up and down. The opening through which the rod 75 projects through the casing 70 is sealed between the inside of the casing and the rod 75 by a resilient bellows 77. That part of the rod 75 which projects outside of the casing 70 is provided with a hanger 78 on which may be placed any desired number of weights 79 to adjust the effective weight of the float 74. The projecting end of the float rod 75 also carries an arm 80 comprising a movable contact arm for a rheostat 81. Inside of vessel 70, pipe 71 projects upward to the top of the vessel, and a baffle plate 82 is located in front of the opening for pipe 69. The purpose is to reduce effect on the float of flow of solution entering through pipe 69 and leaving through pipe 71.

The refrigerating system is charged with, by way of example, a water solution of lithium bromide. The refrigerating system is evacuated and kept evacuated during operation. The application of heat, as previously described, to the generator tubes 12 cause expulsion of water vapor from solution in these tubes. The water vapor flows upward in the tubes 12 and causes solution to likewise flow upward in these tubes. Adjacent the lower ends of the tubes the action is similar to that of an air lift or vapor bubble pump. In the upper regions of the tubes, there is an increasingly larger core of vapor rising in the center of the tube and dragging upward on the inner surfaces of the tubes a film of liquid. The vapor and liquid issue from the upper ends of the tubes 12 into the separator 18.

Vapor flows from the separator 18 through pipe 28 to the condenser 29. The condenser 29 performs the function of liquefying the vapor by condensation thereof on the tubes 30 which are cooled by water flowing through the condenser. The condensate, water, flows from the condenser through pipe 40 into the evaporator 36. The deep trap 42 in the pipe 40 provides for maintaining a column of water to balance the difference in pressures in the evaporator and condenser.

Water is circulated from the evaporator 36 through pipe 46, pump 47, cooling coil 49, and pipe 50 back to the spray head 51 in the upper part of the evaporator. Water sprayed in the evaporator vaporizes to produce a cooling effect. The low pressure for causing this vaporization to take place at a low temperature is maintained by operation of the absorber. The vapor formed in the evaporator 36 flows through the pipe 38 into the absorber. The vapor is here absorbed into the solution and the heat of absorption is removed by transfer to cooling water flowing in the coils 57. Absorption liquid is drawn from the absorber sump 52 and flows through pipe 53, pump 54, and pipe 55 to the spray head 56 from which the solution is again sprayed over the coils 57. This forms one branch of the absorption liquid circuit.

Another branch of the absorption liquid circuit includes the generator 10. Absorption liquid is tapped off from pipe 55 and flows through pipe 67, liquid heat exchanger 64, and pipe 68 to the inlet header 17 of the generator 10. Absorption liquid from which water vapor has been expelled flows from the separator 18 at the upper end of the generator 10 through the pipe 69, the concentration control vessel 70, pipe 71, liquid heat exchanger 64, and pipe 72 to the spray head 73 in the upper part of the absorber 37. The removal of water vapor from the absorption solution in this branch of the circuit maintains the desired concentration of solution in the absorber. The previously described gas lift action in the generator 10 causes circulation of absorption liquid in this branch of the circuit at a rate which varies with the heating of the generator.

Pipe 61 provides an overflow from the separator 18 to the absorber 37. The deep trap 63 in conduit 61 accommodates a liquid column to balance the difference in pressures in the generator and absorber.

When the concentration of absorption liquid flowing through vessel 70 is at the desired value, the float 74 stands in a position such that the contact lever 80 is at the center of the rheostat 81. The resilience of the bellows 77 urges the float to this position. If the solution in vessel 70 becomes lighter, the float sinks. If the solution in vessel 70 becomes heavier, the float rises. Movement of the float 74 causes the contact arm 80 to move one way or the other from the center of resistance 81. This causes the steam valve 26 to be operated. When the float rises, the valve 26 is operated to decrease the supply of steam to the generator 10 so that less water vapor will be expelled from solution in the generator.

Fig. 4 is a diagram of the control circuit between the rheostat 81 and the operating mechanism of the steam valve 26. The valve 26 is operated by a shaft 83 driven by an electric motor which has a winding 84 and a second winding 85. When winding 84 is energized the motor revolves in one direction and when the winding 85 is energized the motor revolves in the opposite direction. A second rheostat 86 is identical with the rheostat 81 and has a contact arm 87 moved by rotation of the valve operating shaft 83. The rheostats 81 and 86 are connected in a symmetrical circuit of which one branch includes a relay coil 88, and the other branch includes a relay coil 89. One side of a source of electrical energy 90 is connected to the rheostat arm 80 and the other side is connected to the rheostat arm 87. When these arms are in the centers of the rheostats 81 and 86 the symmetrical circuits are balanced and the armature 91 of the balancing relay is neutral. The armature 91 operates a single pole double throw switch 92 for connecting one side of the electrical source 90 to either the motor winding 84 or the winding 85. When the float 74 moves the rheostat arm 80 one way or the other, the circuits are temporarily unbalanced, and one winding of the balancing relay overcomes the other to operate the switch 92 to start the motor which operates the steam valve. As the motor turns the valve, the rheostat switch arm 87 is moved until the circuits are again balanced and the relay opens and stops the motor. In this manner, the heat supply to the generator 10 is controlled responsive to changes in concentration of absorption solution in the vessel 70.

The system illustrated in Fig. 5 is generally like that described in connection with Fig. 1, and like parts in these figures are indicated by the same reference numerals. In the system of Fig. 5, the source of steam for heating the generator 10 has been omitted, and the concentration control device has also been omitted, with the understanding that both would be provided in this system in the manner previously described in connection with Fig. 1. The absorber sump 52 is connected by a pipe 93 to a vessel 94 containing a centrifugal pump 95. Electric motor 96, located above the liquid level in vessel 94 is connected by a vertical drive shaft 97 to the pump 95. The motor 96 is mounted on top of the vessel 94, and the drive shaft 97 projects downward into vessel 94. The drive shaft 97 is provided with a labyrinth 98 at the top of vessel 94 to prevent splashing of liquid into the motor chamber. The motor 96 is located within a casing 99 which is sealed to the pump vessel 94.

The pump 95 is connected by a discharge pipe 100 to a purge chamber 101. A pipe 102 connects the purge chamber 101 to the absorber spray head 56. The pipe 67 connects the purge chamber to the liquid heat exchanger 64. The purge chamber 101 is provided with a vent 103 controlled by a valve 104. A float 105 in the purge chamber operates valve 104.

A pipe 106 has one end 107 open in the lower part of the absorber tank 37, and the other end 108 open in the intake of the centrifugal pump 95. During operation of the system in the manner previously described in connection with Fig. 1, solution from the absorber sump 52 flows through pipe 93 into the pump vessel 94. The pump 95 is submerged in liquid in vessel 94 and pumps this liquid through pipe 100 into the purge chamber 101. Liquid flows from chamber 101 through the pipe 102 to the absorber spray head 56. Some liquid also flows from the purge chamber through pipe 67, liquid heat exchanger 64, and pipe 68 to the generator inlet header 17.

Non-condensible gases entering or formed in the still section of the system are swept by vapor flow to the outlet end of the condenser 29. From thence such gases are carried by condensate flowing from the condenser through pipe 40 into the evaporator 36. The gases are trapped by liquid entering the condenser end of pipe 40 due to the provision of the shallow trap or syphon 41. The trapped gases are carried by the flow of liquid through pipe 40 into the evaporator 36. Non-condensible gases in the evaporator 36 and absorber 37 are swept by vapor flow to the lower part of absorber 37 from whence the gases are drawn through pipe 106 into the liquid entering the intake of the pump 95. The gas flows with the liquid from the pump 95 through pipe 100 to the purge chamber 101. The gas accumulates in the upper part of the chamber 101 and when the accumulation is sufficient, the surface level of liquid in the chamber 101 is depressed to such an extent that the float 105 lowers the valve 104 to permit the gas to escape through the vent 103. To cause removal of gas from the purge chamber 101, a vacuum pump may be connected to the vent 103 and controlled so that the vacuum pump operates when the purge valve 104 is open.

In Fig. 6 is shown a part of the system illustrated in Fig. 1, provided with a modified form of concentration control. In this modification, the boiler heating burner 23 is controlled to vary the supply of steam to the generator 10. A pressure operated valve 109 is connected in the fuel line to the burner 23. The pressure chamber 110 of this valve is connected by a pipe 111 to a bleed valve 112. The bleed valve is operated by a rod 113 which projects through the top of a vertical float vessel 114. A bellows 115 provides a seal between the float vessel 114 and the rod 113. A float 116 is fastened on the valve operating rod 113 within the float vessel 114. The separator 18 is connected by a pipe 69 to the float vessel 114, and the float vessel is connected by a pipe 71 to the liquid heat exchanger 64 so that the float vessel 114 contains liquid in its path of flow from the generator 10 toward the absorber.

Pipe 111 is connected by a pipe 117 to a suitable source of fluid under pressure such as compressed air. The pressure of fluid exerted in valve chamber 110 is varied by the amount of opening of the bleed valve 112. When the concentration of solution in the float vessel 114 is at the desired value, the bleed valve opening is such that the boiler heater 23 supplies the desired amount of heat. Upon increase or decrease in concentration of solution in the float vessel 114, the bleed valve 112 is operated by the float 116 to change the heat input to the boiler 21 accordingly.

Various changes and modifications may be made within the scope of the invention as set forth in the following claims.

What is claimed is:

1. An absorption refrigeration system having an absorber, a generator comprising a vapor liquid lift, a heat exchanger, a vapor liquefier, an evaporator, said absorber being connected in an absorption liquid circuit with said generator and said heat exchanger, said circuit having a branch by-passing said generator, and a liquid pump for causing flow in said branch, said liquefier and said evaporator being connected in a refrigerant course between said generator and absorber.

2. An absorption refrigeration system having an absorption liquid circuit including an absorber and a pump connected to receive liquid from the absorber and pump it back through the absorber, a heat exchanger, a vapor liquid lift connected by means including said heat exchanger to receive liquid from said circuit and deliver liquid to said absorber, a liquefier connected to receive vapor from said lift, and an evaporator connected to receive liquid from said liquefier and deliver vapor to said absorber.

3. An absorption refrigeration system having a circuit for absorption liquid, a chamber forming a gas trap in said circuit, a vent from said chamber, and a device for opening and closing said vent responsive to accumulation of gas trapped in said chamber without disturbing flow of liquid in said circuit.

4. A system as set forth in claim 3 in which said device is a valve operated by a float in said chamber.

5. An absorption refrigeration system having a generator, a heater for heating said generator, an absorber, a circuit for absorption liquid including said absorber and a pump for causing circulation of liquid therein, and a branch circuit including said generator connected to receive liquid from and return it to said absorber circuit, said generator comprising a heat-operated liquid circulator to vary the rate of flow of liquid in said branch in accordance with heating thereof.

6. An absorption refrigeration system having a generator, a heater for heating said generator, an absorber, a circuit for absorption liquid including said absorber and a pump for causing circulation of liquid therein, a branch circuit including said generator connected to receive liquid from and return it to said absorber circuit, said generator comprising a heat-operated liquid circulator to vary the rate of flow of liquid in said branch in accordance with heating thereof, and a device operative responsive to concentration of the absorption liquid to control the heating of said generator.

7. In an absorption refrigeration system having a plurality of interconnected elements to provide a closed circuit for circulating a refrigerant and absorption solution, a generator in said circuit having upright tubes forming vertical heating surfaces for expelling refrigerant vapor from the absorption solution and raising solution by vapor lift action, means for heating the generator tubes, and a device responsive to the specific gravity of the absorption solution for controlling the vertical extent to which said generator tubes are heated to maintain the concentration of the solution within predetermined limits.

8. In an absorption refrigeration system having a plurality of interconnected elements to provide a closed circuit for circulating a refrigerant and absorption solution, a generator in said circuit having upright tubes forming vertical heating surfaces for expelling refrigerant vapor from the absorption solution and raising the solution by vapor lift action, means for supplying heating medium to heat the generator tubes, a modulating valve for regulating the supply of heating medium to said generator, and a device responsive to the specific gravity of the absorption solution for adjusting the valve in accordance with variations in the concentration of the absorption solution whereby to maintain the concentration within predetermined limits.

9. In an absorption refrigeration system having a plurality of interconnected elements to provide a closed circuit for circulating a refrigerant and absorption solution, a generator in said circuit for expelling refrigerant vapor from the absorption solution, means for supplying steam to heat said generator, a modulating valve for controlling the flow of steam to said generator, and a float responsive to the specific gravity of the absorption solution flowing from the generator for adjusting the modulating valve in accordance with the concentration of the solution whereby to maintain the concentration within predetermined limits.

10. In an absorption refrigeration system having a plurality of interconnected elements to provide a closed circuit for circulating a refrigerant and absorption solution, a generator in said circuit for expelling refrigerant vapor from the absorption solution, means for heating the generator, a modulating valve for regulating the heating of said generator, an electric motor for adjusting said valve, and a float responsive to the specific gravity of the absorption solution flowing from the generator for controlling the operation of said motor in accordance with variations in the concentration of the absorption solution whereby to maintain the concentration within predetermined limits.

11. In an absorption refrigeration system having a plurality of interconnected elements to provide a closed circuit for circulating a refrigerant and absorption solution, a generator in said circuit for expelling refrigerant vapor from the absorption solution, means for heating said generator, a modulating valve for regulating the heating of said generator, an electric motor for adjusting said valve, an electric circuit for said motor including a resistance, and a movable member responsive to the specific gravity of the absorption solution, said movable member varying the resistance of the electric circuit to adjust said valve in accordance with variations in the concentration of the absorption solution whereby to maintain the concentration within predetermined limits.

12. In an absorption refrigeration system having a plurality of interconnected elements to provide a closed circuit for circulating a refrigerant and absorption solution, a generator in said circuit for expelling refrigerant vapor from the absorption solution, means for heating said generator, a modulating valve for regulating the heating of said generator, an electric motor for adjusting said valve, an electric circuit for said motor including a resistance, a chamber connected in said system for receiving concentrated absorption solution from the generator, and a float in said chamber responsive to the specific gravity of the absorption solution, said float having a movable arm for varying the resistance of the electric circuit to adjust said valve in accordance with variations in the concentration of said absorption solution whereby to maintain concentration within predetermined limits.

13. In an absorption refrigeration system having a plurality of interconnected elements to provide a closed circuit for circulating a refrigerant and an absorption solution, a generator in said circuit, means for heating said generator to expell refrigerant vapor from the absorption solution, a valve for controlling the heating of said generator, an electro-magnetic device for adjusting the valve to vary the heating of said generator, a rheostat connected to said device, and a sensing element in said circuit responsive to the concentration of the absorption solution and connected to operate the rheostat and thereby actuate the valve to adjust the operation of the generator in accordance with the condition of the absorption solution.

14. In an absorption refrigeration system having a plurality of interconnected elements to provide a closed circuit for circulating a refrigerant and an absorption solution, a generator in said circuit, means for supplying steam to said generator to heat the absorption solution and expell refrigerant vapor therefrom, an adjustable valve for controlling the flow of steam to said generator, and a float in the circuit responsive to the concentration of the absorption solution flowing from the generator and connected to adjust the valve whereby to increase or decrease the heating of said generator in accordance with the concentration of the absorption solution.

15. In an absorption refrigeration system of the type which operates in a partial vacuum and in which non-condensable gases may accumulate, a circuit for absorption liquid including an absorber and comprising two branches, said circuit including an unheated liquid circulator and one of the branches including a heated liquid circulator, a circuit for refrigerant from said heated circulator to said absorber including a condenser and evaporator, means for heating the liquid circulator, a device in the absorption liquid circuit responsive to the concentration of the liquid therein to control the rate of heating of said liquid circulator, a chamber in the absorption liquid circuit forming a gas trap, a vent from said chamber, and a device for opening and closing said vent responsive to accumulation of gas trapped in said chamber.

16. An absorption refrigeration system having an absorber connected in a first circuit for absorption liquid including an unheated liquid circulator, said absorber also being connected in a second circuit for absorption liquid including a heat exchanger and a heated liquid circulator, and a course for refrigerant from said heated circulator to said absorber including a liquefier and evaporator.

THE NATIONAL CITY BANK,
*Administrator of the Estate of Albert R. Thomas, Deceased,*
By JOHN N. EWING,
*Vice President.*

REFERENCES CITED

The following references are of record in the file of this patent:

UNITED STATES PATENTS

| Number | Name | Date |
|---|---|---|
| 942,368 | Dyer | Dec. 7, 1909 |
| 1,890,531 | Schurtz | Dec. 13, 1932 |
| 2,282,504 | Thomas et al. | May 12, 1942 |
| 2,298,924 | Bichowsky | Oct. 13, 1942 |
| 2,353,859 | Thomas | July 18, 1944 |
| 2,365,797 | Bichowsky | Dec. 26, 1944 |
| 2,378,177 | Bichowsky | June 12, 1945 |
| 2,384,861 | Roswell | Sept. 18, 1945 |